(12) United States Patent
Gurley (10) Patent No.: US 9,239,444 B2
(45) Date of Patent: Jan. 19, 2016

(54) INCIDENT AND REFLECTIVE MIRROR ARRAY FOCUSING BY KINEMATIC FUNCTION CONTROL

(71) Applicant: Austin R Gurley, Auburn, AL (US)

(72) Inventor: Austin R Gurley, Auburn, AL (US)

(*) Notice: Subject to any disclaimer, the term of this patent is extended or adjusted under 35 U.S.C. 154(b) by 152 days.

(21) Appl. No.: 14/034,549

(22) Filed: Sep. 23, 2013

(65) Prior Publication Data

US 2015/0085390 A1   Mar. 26, 2015

(51) Int. Cl.
*G02B 7/183* (2006.01)
*F24J 2/12* (2006.01)

(52) U.S. Cl.
CPC ..................................... *G02B 7/183* (2013.01)

(58) Field of Classification Search
CPC .... G02B 7/183; G02B 19/0041; G02B 19/00; F24J 2/10
USPC .......................... 359/851–854, 865, 872, 873; 126/684–687, 689, 696, 700; 136/252
See application file for complete search history.

(56) References Cited

U.S. PATENT DOCUMENTS

| | | | | |
|---|---|---|---|---|
| 4,109,638 | A * | 8/1978 | Matlock et al. ................ | 126/605 |
| 4,368,962 | A * | 1/1983 | Hultberg ........................... | 353/3 |
| 2010/0051016 | A1* | 3/2010 | Ammar ........................... | 126/600 |
| 2011/0168160 | A1* | 7/2011 | Martinez Moll et al. ..... | 126/573 |

* cited by examiner

*Primary Examiner* — Stephone B. Allen
*Assistant Examiner* — Rahman Abdur
(74) *Attorney, Agent, or Firm* — Jon David Jackson

(57) ABSTRACT

An array of Fresnel reflectors is presented with an adjustable focus. The focus of the array is controlled by only a few mechanical parts and simple inputs. One preferred embodiment of this device is to collect sunlight and focus it onto a photovoltaic (PV) cell or a boiler, for the purpose of collecting solar energy. This solar collector, or heliostat, is easily adjusted so that it always directs the sun's rays onto the PV cell or boiler.

14 Claims, 8 Drawing Sheets

INCIDENT AND REFLECTIVE MIRROR ARRAY FOCUSING BY KINEMATIC FUNCTION CONTROL

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

This invention relates to a mirror array with an adjustable focus. A preferred embodiment of the invention is in the field of solar energy collection. Such devices are commonly called heliostats, and often—as in this case—can adjust throughout the year, according to the season. Furthermore, many heliostats track the sun daily from east to west 2. Description of Related Art The prior art contains many examples of adjustable mirror arrays, many of which are primarily or exclusively designed as solar collectors. These heliostats employ a great variety of methods to attain the goal of focusing sunlight on a common point. Some of these heliostat arrays contain many individually controlled mirrors, such as U.S. Pat. Nos. 4,122,827 and 7,192,146. Other arrays, including U.S. Pat. Nos. 4,102,326, 4,425,904, 4,466,423, and 4,832,002 contain mirrors that are linked together mechanically, but with cables or belts. The arrangement of cables requires, however, that each mirror moves the same amount under a single input, but the present invention moves each mirror a different amount in order to preserve the parabolic geometry of the reflector array. Furthermore, it is believed that cables may pose a liability, as they can break. Related U.S. Pat. Nos. 4,110,010, 7,677,241 and 7,905,227, are mechanically linked with configurations that appear more robust than the arrays using cables.

U.S. Pat. No. 6,349,718 looks similar in some respects to the present invention, but is actually substantially different, particularly regarding the movement of the mirrors. It appears that they can be independent or linked together, but if linked, they are to be forced to move the same amount.

BRIEF SUMMARY OF THE INVENTION

The present invention comprises an array of mirrors, designed with an adjustable focus. In its present embodiment, it is configured to reflect parallel incident rays onto a common point. The focal point can be moved in multiple dimensions, and the array can also be adjusted to account for the direction of the incident rays. The preferred embodiment of the invention is to reflect sunlight and focus it onto a solar collector; such a device is commonly known as a heliostat. The contributing theory that inspired the invention comes from Fresnel; concentric rings can be used in lieu of a large spherical or parabolic mirror, reducing expense and material, and in this case allowing for a simple method to adjust the focus. In placing the mirror arrays around a solar collector, it is possible but not required that the mirrors be arranged concentrically.

The mirrors in this array are linked together; they need not be controlled individually. This is believed to be especially beneficial, given the large number of mirrors expected in a large-scale solar collector facility. Because of this linkage, all the adjustments enumerated above can be made with only two mechanical inputs on each control axis.

One particular feature of this array is the use of an expanding linkage, in the form of a lattice, between mirrors to rotate the mirrors. This allows each mirror to be rotated a different amount, proportional to its location in order to focus all the mirrors exactly on the desired point.

DETAILED DESCRIPTION OF THE INVENTION

Figure 1A:
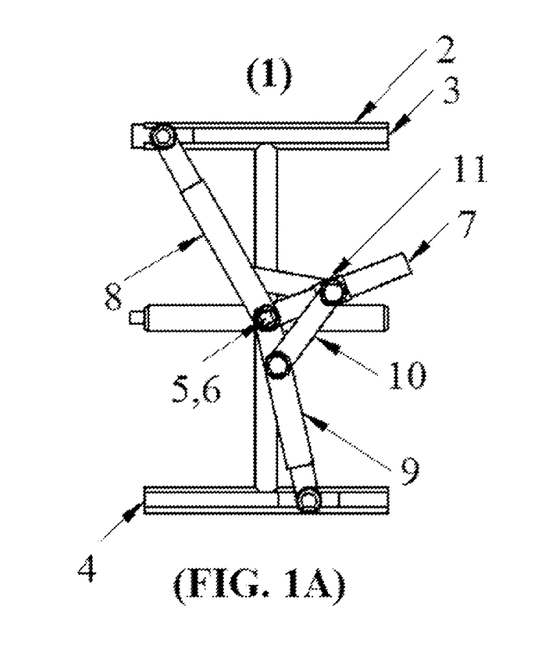
FIG. 1. Single mirror motion element
FIG. 2. Alternate single mirror motion element
FIG. 3. Idealized Control element
FIG. 4. Mirror control structure
FIG. 5. One-dimensional array of mirrors
FIG. 6. Several side views of array
FIG. 7. Two-dimensional array of mirrors
FIG. 8. Solar collector facility
Figure 1B:
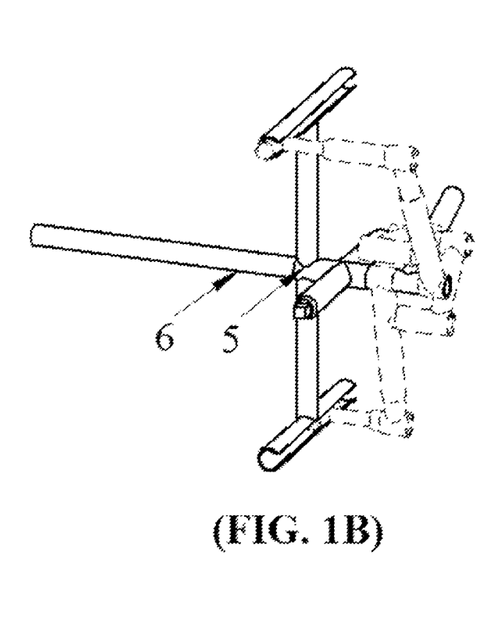

FIG. 1 shows a single mirror motion element (1). The full array requires one of these per mirror. The first part of the element is a frame (2) containing two grooves, top (3) and bottom (4). The center of the frame contains a hole (5), in which a rotating axle (6) is held. At one end of the rotating axle (6), an arm (7) is affixed to facilitate the rotation.

Figure 5:
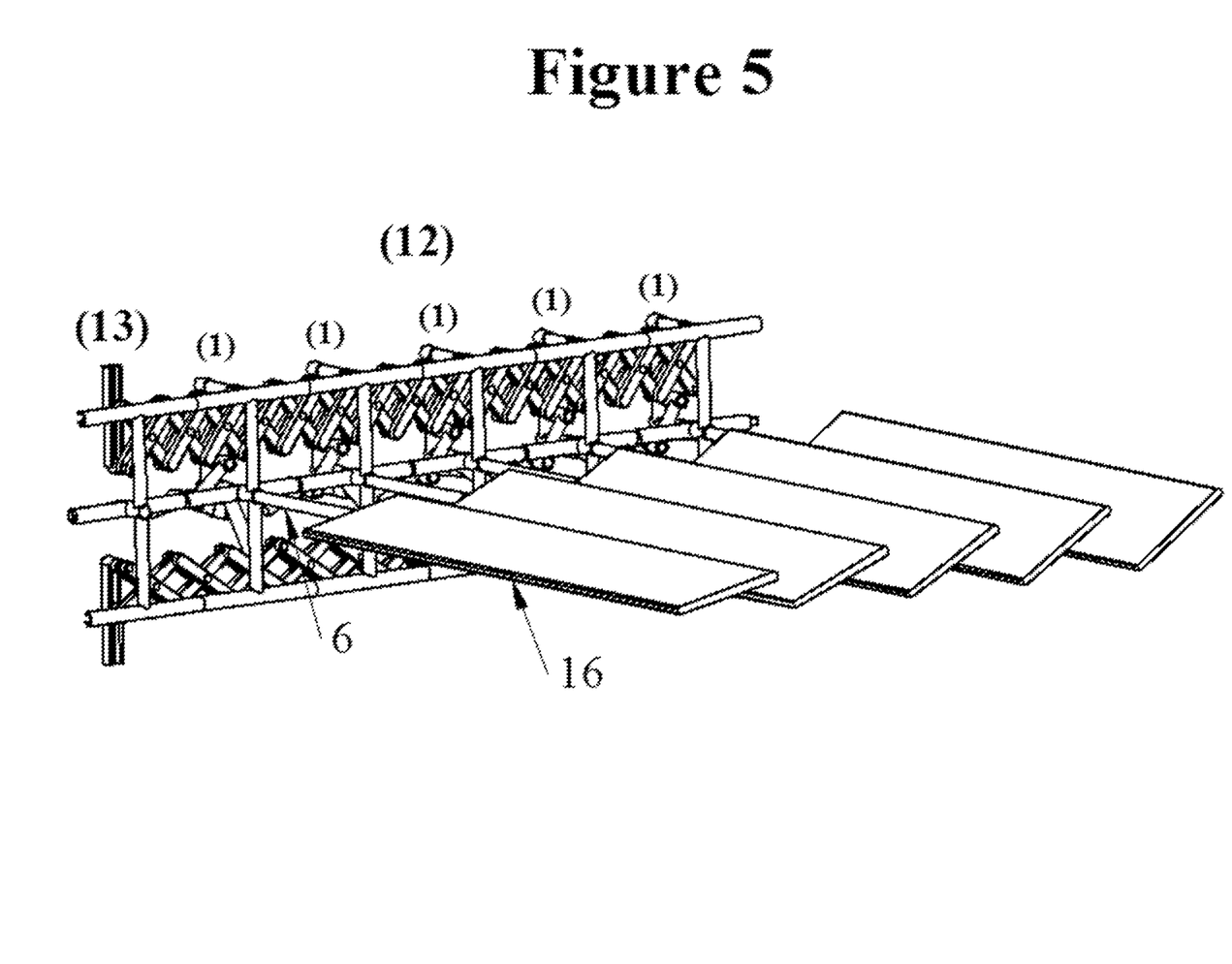

A top extensible shaft (8) extends from the top groove (3) to the rotating axle (6). The extensible shaft (8) is designed for one end to slide horizontally through the top groove (3) and the other end to rotate freely around the rotating axle (6) without directly rotating it. Likewise, a bottom extensible shaft (9) comprises one end that slides along the bottom groove (4), and the other end that rotates freely about the rotating axle (6). The top (8) and bottom (9) extensible shafts connect to the arm (7) via connecting rods (10). One end of each rod (10) is allowed to rotate freely where it is mounted to the extensible shafts (8-9). The other end of each rod (10) is constrained to pivot within a collar (11) which is free to slide along the arm (7). As the rods (10) slide, they cause the collar (11) and arm (7)—and by extension, the rotating axle (6)—to rotate in the hole (5). The rotating axle (6) will support a mirror (16), which will rotate with the axle (6), as is shown in FIG. 5.

Figure 2A:
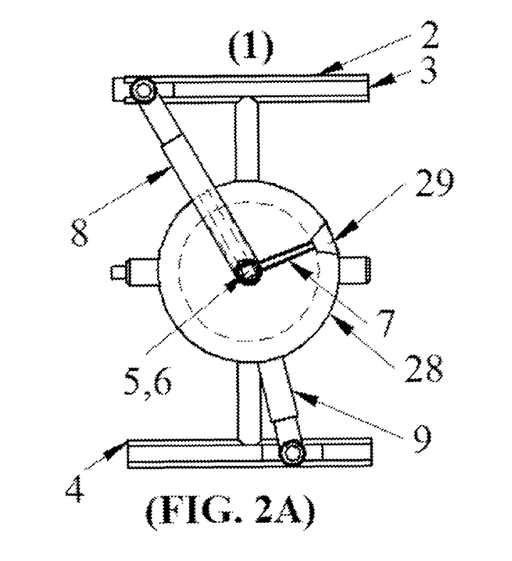
Figure 2B:
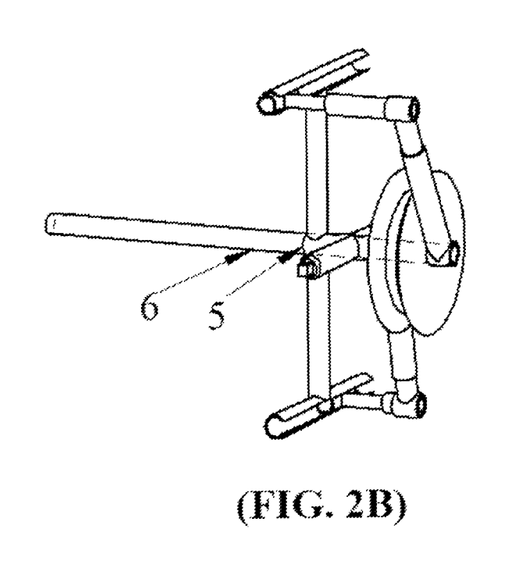

FIG. 2 shows an alternate embodiment of single mirror motion element (1). The full array requires one of these per mirror. The first part of the element is a frame (2) containing two grooves, top (3) and bottom (4). The center of the frame contains a hole (5), in which a rotating axle (6) is held. At one end of the rotating axle (6), an arm (7) is affixed to facilitate the rotation.

A top extensible shaft (8) extends from the top groove (3) to the rotating axle (6). The extensible shaft (8) is designed for one end to slide horizontally through the top groove (3) and the other end to rotate freely around the rotating axle (6)

without directly rotating it. Likewise, a bottom extensible shaft (9) comprises one end that slides along the bottom groove (4), and the other end that rotates freely about the rotating axle (6). The top (8) and bottom (9) extensible shafts support large bevel gears (28). Each large bevel gear (28) is allowed to rotate freely where it is mounted to the extensible shafts (8-9). A small bevel gear (29) is allowed to rotate freely around arm (7). The toothed surface of the large bevel gear (28) meshes with the small bevel gear (29). As the large bevel gears (28) rotate, they cause the small bevel gear (29) on arm (7)—and by extension, the rotating axle (6)—to rotate in the hole (5). The single mirror motion element (1) described and shown in FIG. 1 will be used for farther illustration, though the mirror motion element (1) of FIG. 2 could be substituted with no alteration to farther description of mechanism motion.

Figures 3A, 3B, 3C:
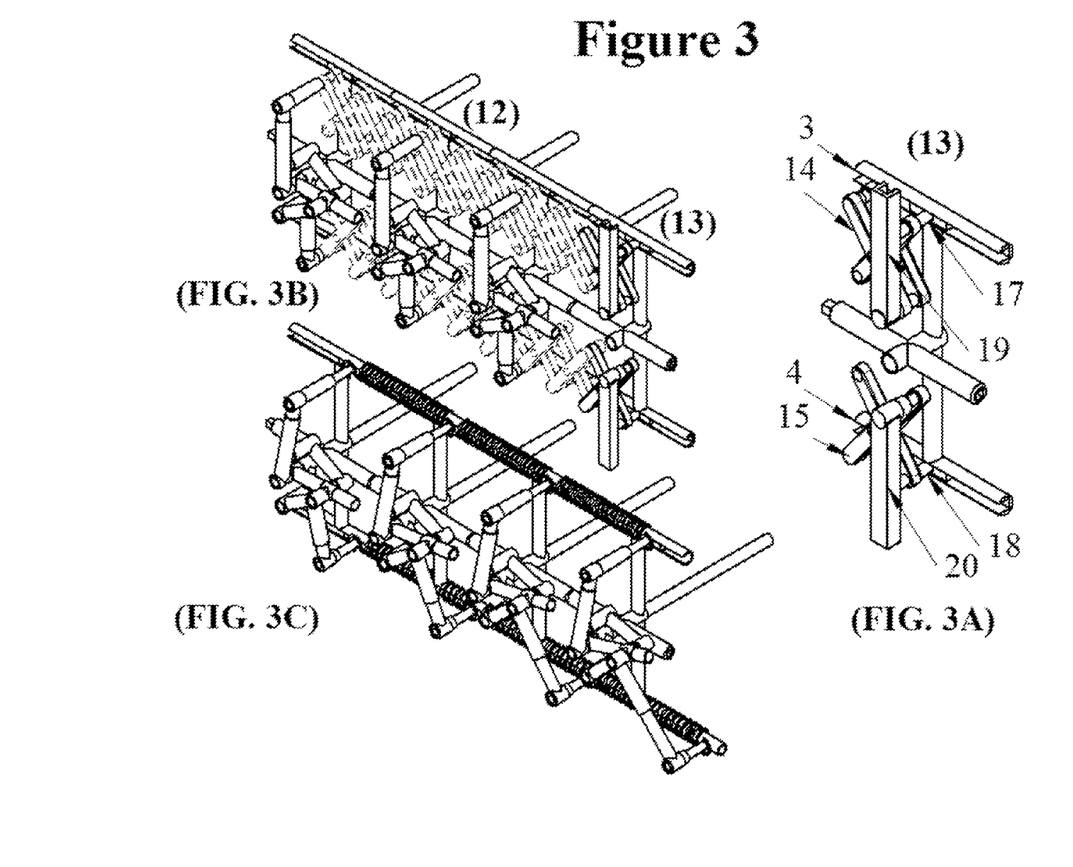

Referring to FIG. 3, in FIG. 3A a detailed illustration of the control element (13) is shown. In FIG. 3B it is shown in context within the mirror control structure (12). The top (3) and bottom (4) grooves present in the mirror motion elements (1) extend through the control element (13). The top lattice (14) contains a top slide (17) at its top corner; the top slide (17) fits in the top groove (3), and as it slides it translates the entire top lattice (14) from side to side. Likewise, the bottom lattice (15) contains a bottom slide (18) at its bottom corner, which slides within the bottom groove (4) and translates the bottom lattice (15). Vertical slides (19-20) span across the end of each lattice (14-15), causing expansion or contraction with the results described in the previous paragraph.

Looking further at FIG. 3A, a wide variety of configurations can be achieved using only the slides shown (17-20). First, the top slide (17) allows the array to track the sun throughout the day. The bottom slide (18) adjusts the x coordinate of the array's focal point. The vertical slides (19-20) control the z coordinate of the focus. As a result, only four slides (17-20) will move or rotate all the mirrors in the array; the number of mirrors that can be moved will be limited only by the manufacturing, specifically the weight and compliance of the moving parts. The slides themselves will be moved by any desired actuating means, including motors, hydraulics or pneumatics, cables, belts, chains, or other means; there is no preferred mode, but the actuating means should be equivalent to one another for the purpose of this invention.

Referring now to FIG. 3B, the mirror control structure (12) is shown, which is comprised of multiple mirror motion elements (1) in addition to a control element (13). The control structure (12) may be manufactured as one piece; alternatively, several mirror motion elements (1) may be produced separately and placed together sequentially with a control element (13) added. The control structure (12) further includes two expanding lattices, top (14) and bottom (15). The purpose of these is to slide the ends of the extensible shafts (8-9) along the grooves (4-5), causing the rotation described above. If an entire lattice (14 or 15) is moved, all the mirror motion elements (1) will be adjusted similarly, as required to maintain the focus. If a lattice (14 or 15) is made to expand or contract by using the vertical slides (19 or 20), the mirror motion elements (1) will be adjusted proportionally to their distance from the end of said lattice (14 or 15). As an alternative to the expanding lattice framework, it may be desirable, and would be comparably achieved, to replace the lattice with threaded rods or springs, as shown in FIG. 3C.

Figure 4A:
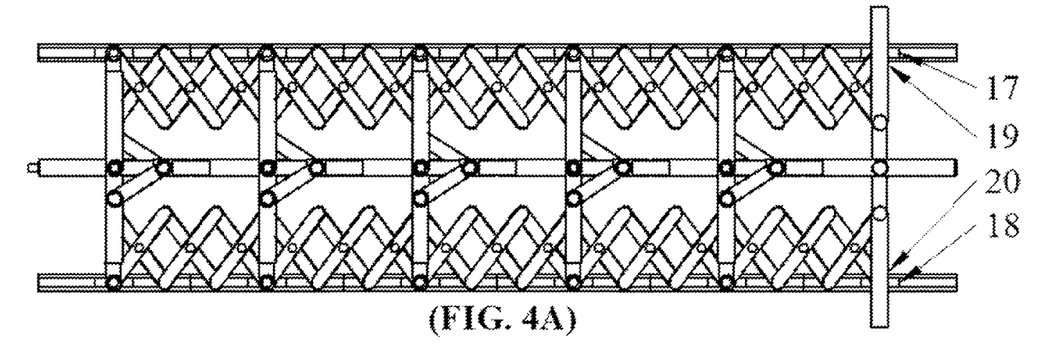
Figure 4B:
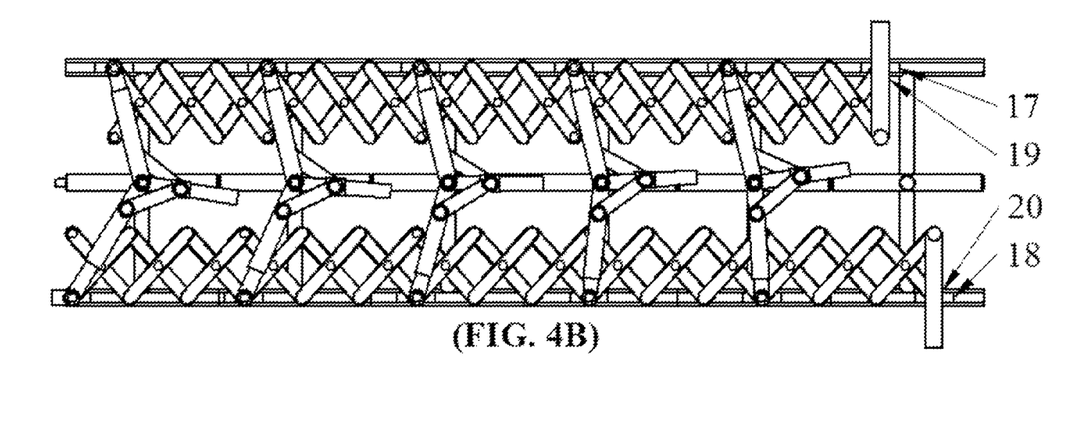

A representative example of control motion is illustrated in FIG. 4. The control structure is shown first, in FIG. 4A, maintaining a position in which all mirror control elements are held in an original position; level and at equal angles. It is seen that neither the top (17) nor bottom (18) slide, neither the top (19) nor bottom (20) vertical slide, has been displaced from the level and equal condition shown in FIG. 4A. In FIG. 4B, the control structure is shown again in a representative new position. It is seen in FIG. 4B that the top slide (17) has been displaced laterally, while the top vertical slide (19) has not been displaced from its original position. Thus the upper portion of the control elements in this configuration is set to receive parallel light from a location laterally displaced from the controller. It is also seen in FIG. 4B that the bottom slide (18) and the bottom vertical slide (20) have both been displaced from the level and equal condition shown in FIG. 4A. In FIG. 4B it is seen that the bottom slide (18) has been displaced laterally, and the bottom vertical slide (20) vertically, from the original position. Thus the lower portion of the control elements in this configuration is set to reflect light to a location slightly laterally displaced and vertically displaced from the controller.

FIG. 5 shows the mirror control structure (12) on the opposite side. The control element (13) is now on the left, with the mirror control elements (1) on the right. Several of the rotating axles (6) are shown, each one attached to a mirror (16) attached. Depending on the state of the control element (13), each rotating axle (6) may be rotated at a different angle. The result of this differential rotation is that the mirrors (16) are rotated differently as well, which is seen in the figure. In order to achieve the desired mirror configuration, the control element (13) is used to account for the angular position of the sun, as well as the horizontal and vertical distance to the desired focus. It is likely that the position of the focus will be the location of an energy collector, and may be set at installation, as well as whenever needed. The position of the sun will change throughout each day, and the adjustment for that parameter will undergo continual change, directed by the control element (13).

Looking now at FIG. 6, it is noted that the mirrors (16) will be systematically rotated so that light from the sun will reflect to a common focal point. As shown in the FIGS. 6A-6C, it is possible to program a range of (x,z) coordinates for the incident light as well as the reflected light. In the preferred embodiment, the incident light will come from the sun, very far away, and will arrive as parallel rays. This will be the standard operating mode, as shown in FIGS. 6D-6E, though the device is capable of focusing non-parallel light as seen in the other figures.

Figure 6A:
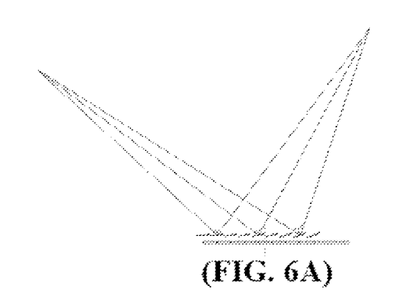
Figure 6B:
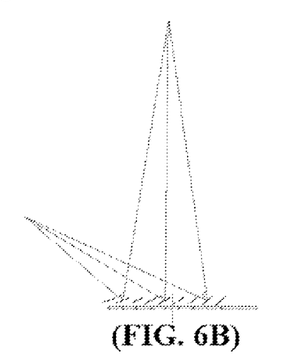
Figure 6C:
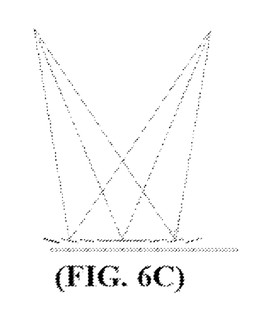
Figure 6D:
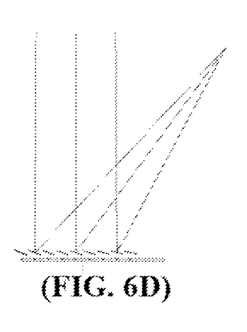
Figure 6E:
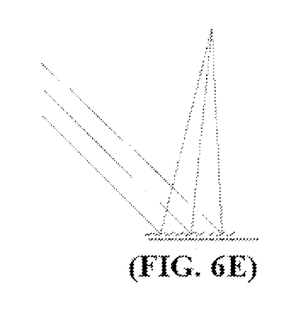
Figure 7A:
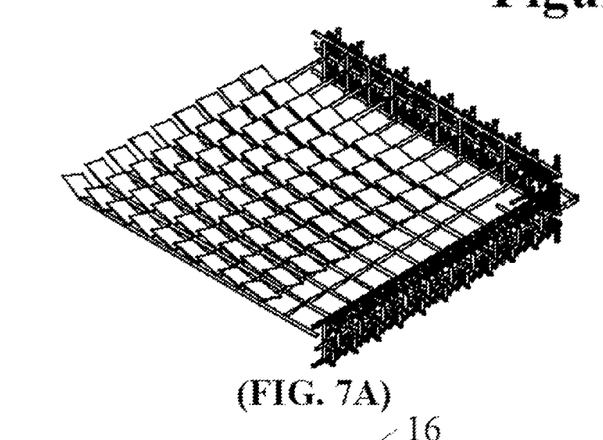

Looking at FIG. 7, it is further possible to create a 2-dimensional array of mirrors (16), which will allow a 3-dimensional focus adjustment and also provide a greater efficiency for energy collection or storage. The first consideration to this end is to use two mirror control structures (12)—one for the x-direction and one for the y-direction. FIG. 7A shows a 2-dimensional array of mirrors (16) rotated about 2 axes, which may be adjusted to focus in 3 dimensions. FIG. 6A also shows one embodiment, to arrange the control structures (12) at right angles. This embodiment would require support structures on the remaining 2 sides of the array (not shown in the figure).

Figure 7B:
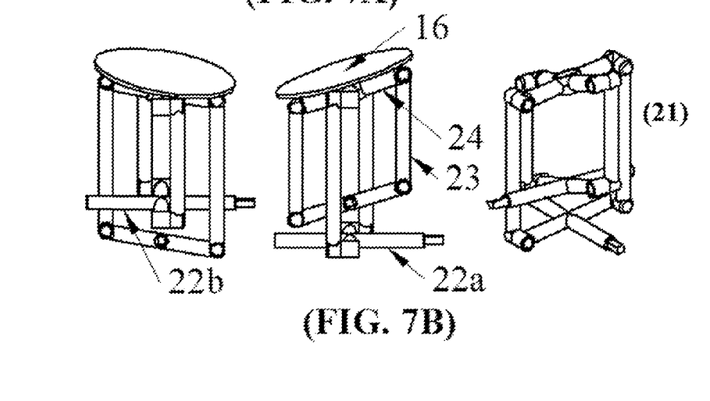
Figure 7C:
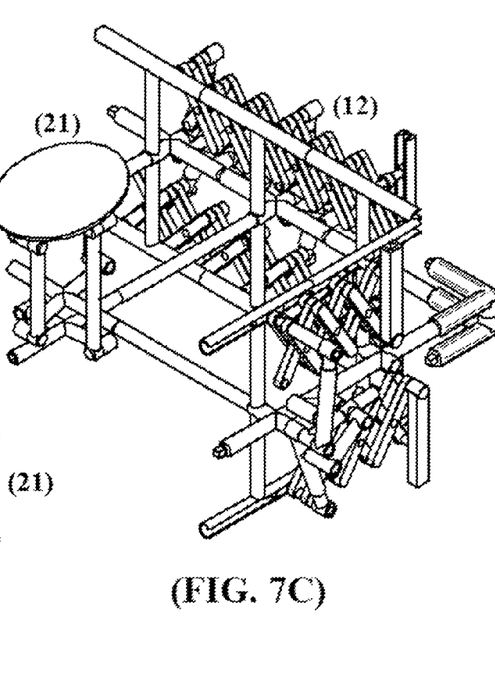

Looking further at FIG. 7, some additional consideration is required to attach both control structures (12) to each mirror. FIG. 7B shows one of many solutions: a gimbal (21), which allows the mirror (16) to rotate about two axes. The gimbal (21) allows rotation using the following mechanism, which will be repeated along both axes. First, a rotating cross (22) will be attached to the rotating axle (6), as well as potentially to the rotating crosses (22) of adjacent gimbals (21), to rotate as the control structure (12) is adjusted. At opposite ends of each cross (22), a vertical beam (23) is attached to translate the rotational motion of the cross (22). The vertical shafts (23)

then connect to cross-members (24) on the underside of each mirror (16), so that as the cross rotates, the mirror (16) rotates equally in the same direction. Note that the cross-members (24), capable of swiveling such that the angle between the two is not fixed, are necessary such that rotation of one axis (22A) does not affect the accurate positioning of the other axis (22B) as the mirror (16) is inclined. By including the described mechanism in two directions, independent rotation is made possible in two axes. FIG. 7C shows an example of a gimbal (21) attached to the rotating axles (6) of two perpendicular control structures (12).

Figure 8:
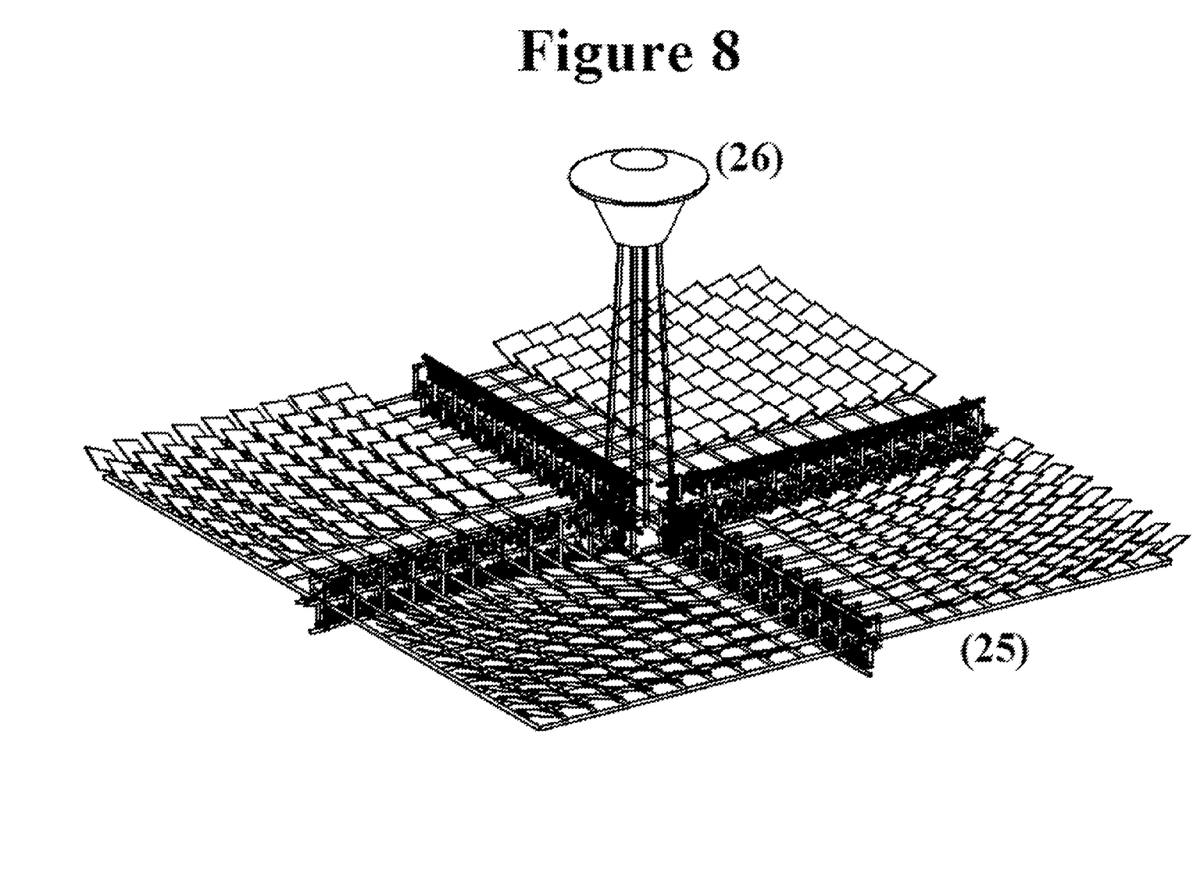

Looking now at FIG. 8, a solar collector facility is shown. The entire array (25), as described in detail above, is placed near an energy collector (26), such as a boiler or photovoltaic cell. As shown in the figure, one array (25) may be arranged around a collector. In this case, it is still considered a single array because it may be controlled by a single set of four inputs for each axis. However, it will be appreciated that alternative arrangements are possible, without changing the novelty of the invention. For example, the same arrangement of mirrors could possibly be separated into a plurality of arrays, whereby more inputs, controllers, motors, etc. are used to control the motion of the mirrors in different locations. Furthermore, the invention as shown in FIG. 8 can be expanded within a solar collecting facility, with multiple collectors. In this expansion, each collector may be used in conjunction with a single array, or with multiple arrays as well. In this embodiment, it is quite conceivable that the controller and the power may be shared by multiple arrays.

I claim:

1. A mirror control structure, comprising
  a plurality of interconnected mirror motion elements, each of which rotates one or more mirrors, and which rotate together, with a combination of equal rotations and rotations proportional to their respective locations, said mirror motion elements rotating a plurality of mirrors in a desired formation to reflect light from a source to a desired focal point,
  a mirror control element, which actuates said mirror motion elements in order to move said mirrors equally and/or proportionally to adjust the focal points of the array of said mirrors, which is comprised of
  top and bottom grooves, such as those present in said mirror motion elements,
  a top lattice containing a top slide at its top corner, said top slide fitting in said top groove, which translates the entire top lattice as it slides,
  a bottom lattice containing a bottom slide at its bottom corner, said bottom slide fitting in said bottom groove, which translates the entire bottom lattice as it slides,
  Vertical slides spanning across the end of each said expanding or contracting each lattice,
  expanding means, to transfer the controlling motion of said mirror control element appropriately to said mirror motion elements, in order to rotate said mirrors in desired pattern.

2. A mirror control structure as in claim 1, wherein said mirror motion elements are further comprised of
  a frame containing two grooves, top and bottom,
  a hole in said frame,
  a rotating axle in said hole,
  an arm affixed to said axle, to facilitate the rotation,
  a top extensible shaft extending from said top groove to the rotating axle, so that one end may slide horizontally through said top groove and the other end may rotate freely about said rotating axle without directly rotating it,
  a bottom extensible shaft extending from said bottom groove to the rotating axle, so that one end may slide horizontally through said bottom groove and the other end may rotate freely about said rotating axle without directly rotating it.

3. A mirror control structure as in claim 2, wherein said mirror motion elements are further comprised of connecting rods to connect said top and bottom extensible shafts to said arm, each of which is allowed to rotate freely where it is mounted to the extensible shafts, but with the other end of each constrained to slide along said arm, causing said arm to rotate as said connecting rods slide, which in turn rotates said rotating axle.

4. A mirror control structure as in claim 2, wherein said mirror motion elements are further comprised of a center bevel gear on the end of said arm, for transfer of motion to the axle, and two side bevel gears, able to rotate freely on the axle, and oriented to transfer rotary motion to the axle by way of said center bevel gear, and wherein said top extensible shaft is attached to one of the side bevel gears and able thus to impart rotary motion to the center bevel gear, and thus to the arm and axle concurrently, and wherein said bottom extensible shaft being attached to the second of the side bevel gears and able thus to impart rotary motion to the center bevel gear, and then to the arm and axle concurrently.

5. A mirror array, comprising
  one or more mirror control structures as in claim 1,
  one or more mirrors attached to each rotating axle, such that said mirrors rotate concurrently with said axles.

6. A mirror array as in claim 5, with one mirror control structure, with said mirrors directly attached to said axles.

7. A mirror array as in claim 5, with one mirror control structure, with said mirrors indirectly attached to said axles via a gimbal.

8. A mirror array as in claim 7, said gimbal comprising
  a rotating cross,
  one or more vertical beams, such that the rotational motion of said axles is transmitted through said vertical beams to said mirrors, mounted above said axle.

9. A mirror array as in claim 5, with two mirror control structures, and wherein said mirrors are indirectly attached to said axles via a gimbal.

10. A mirror array as in claim 9, said gimbal comprising
  two rotating crosses,
  one or more vertical beams per cross, such that the rotational motion of said axles is transmitted through said vertical beams to said mirrors, mounted above said axle,
  A cross member underneath the mirror preserving accuracy of orientation in the two control planes.

11. A solar collector facility, comprising
  one or more mirror arrays described in claim 5,
  an energy collector.

12. A solar collector facility as in claim 11, wherein said energy collector is comprised of one or more photovoltaic cells.

13. A solar collector facility as in claim 11, wherein said energy collector is comprised of a means of collecting energy in the form of generated heat.

14. A solar collector facility as in claim 13, wherein said energy collector is comprised of a boiler.

* * * * *